United States Patent
Führing et al.

[15] 3,662,417
[45] May 16, 1972

[54] APPARATUS FOR THE CLEANING OF VEHICLE WHEELS

[72] Inventors: Heinrich Führing, Augsburg; Richard Fleschhut, Goeggingen, both of Germany

[73] Assignee: BOWE, Bohler & Weber KG Maschinenfabrik, Augsburg, Germany

[22] Filed: July 15, 1970

[21] Appl. No.: 55,093

[30] Foreign Application Priority Data

July 19, 1969 Germany..................P 19 36 906.3

[52] U.S. Cl............................................15/21 D, 15/DIG. 2
[51] Int. Cl. .........................................................B60s 3/06
[58] Field of Search...................15/DIG. 2, 21 R, 21 D, 21 E, 15/53, 97, 302

[56] References Cited

UNITED STATES PATENTS

| | | | |
|---|---|---|---|
| 2,978,718 | 4/1961 | Vani et al................................ | 15/21 R |
| 3,058,133 | 10/1962 | Haverberg.............................. | 15/21 R |

*Primary Examiner*—Edward L. Roberts
*Attorney*—Karl F. Ross

[57] ABSTRACT

An apparatus for the cleaning of vehicle wheels, e.g. in conjunction with a vehicle-washing installation, comprises at least one pair of rotatable brushes which can be pressed against the wheels and, for at least a limited portion of the longitudinal displacement of the vehicle, can move therewith while maintaining their rotary cleaning action.

15 Claims, 11 Drawing Figures

PATENTED MAY 16 1972          3,662,417

Heinrich FÜHRING
Richard PLESCHHUT
              *INVENTORS*

BY    Karl F. Ross

INVENTORS
Heinrich FÜHRING
Richard FLESCHHUT
BY
Karl G. Ross

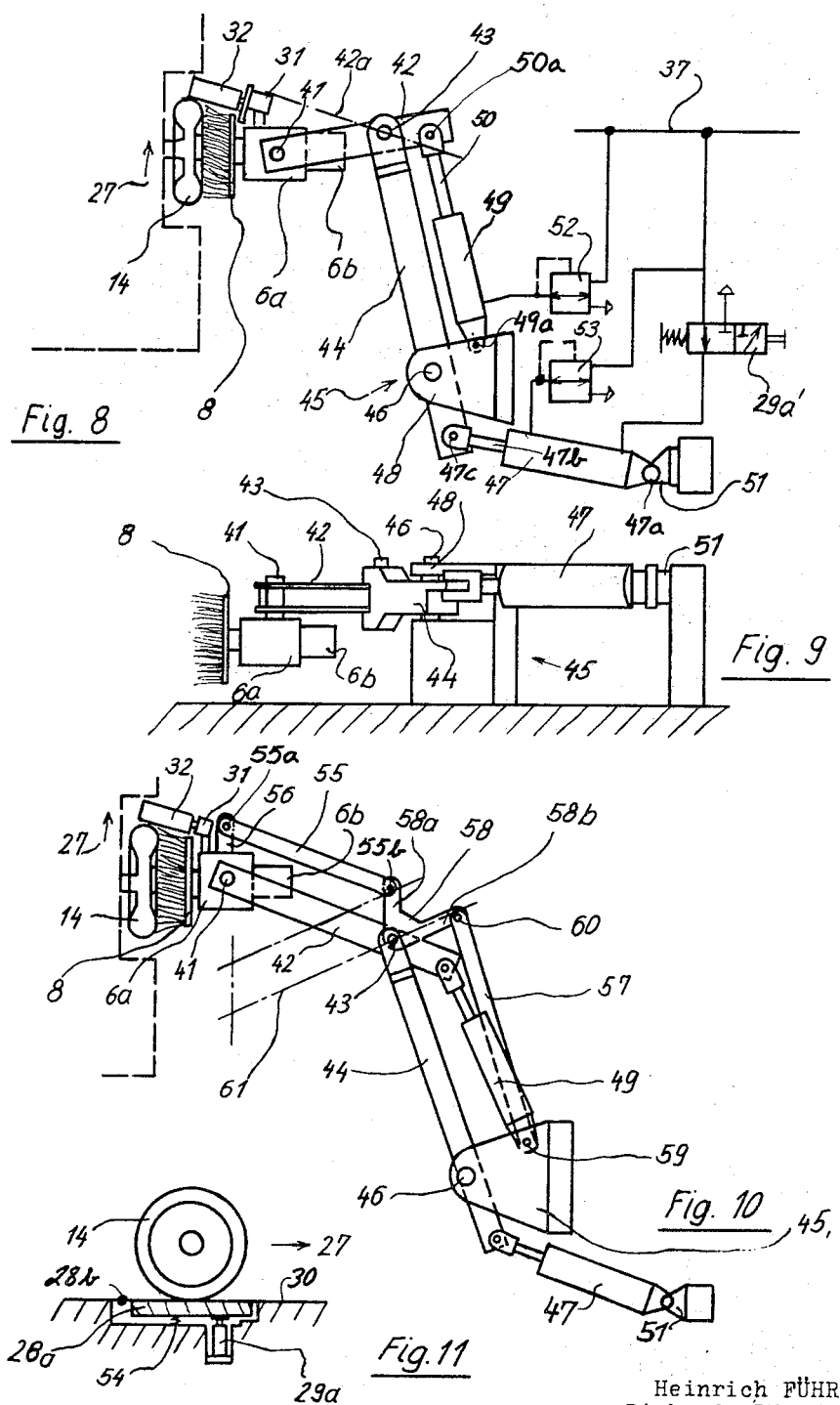

APPARATUS FOR THE CLEANING OF VEHICLE WHEELS

Our present invention relates to an apparatus for the cleaning of vehicle wheels and, more particularly, to a system for the efficient washing of the wheels and tire sidewalls of an automotive vehicle.

It has been proposed to provide devices generally in conjunction with automobile-washing installations, for the cleaning and washing of the wheels of the vehicle. The term "vehicle wheel" is used herein to designate the entire observable outer surface of the vehicle-wheel structure and may include the wheel itself, with hub and rim, any hub cap or wheel cover fully or partially enclosing the wheel disk and the sidewalls of the tire extending outwardly from the rim.

In general, such prior art devices have comprised a brush which was urged against the vehicle wheel for a brief interval and attempted to wash or clean the latter. Satisfactory cleaning, however, was seldom achieved with these devices. The unsatisfactory results characterizing such units are attributable, on the one hand, to the fact that the wheel-cleaning arrangement was generally provided as an incidental to the apparatus for cleaning the surfaces of the vehicle and frequently the brush used to wash the flanks of the vehicle was merely extended to come into contact with the wheel structure. Another disadvantage has been that the prior art systems were incapable of overcoming the blocking effect of the mudguards, aprons and fenders of the vehicle which obstructed the use of vehicle-cleaning brushes. Finally, a large part of the inability of the prior art systems to satisfactorily wash the wheels of the vehicle can be attributed in large part to the brief period which the wheel encounters the brush.

It is, therefore, the principal object of the present invention to provide an improved apparatus for the washing of the wheels of an automotive vehicle.

A further object of our invention is to provide an apparatus of this character which will afford a more efficient cleaning of the wheels of an automotive vehicle during, prior to or subsequent to the washing of the vehicle.

Another object of our invention is to provide a wheel-cleaning arrangement which is effective for wheels of different sizes, degrees of soiling, profiles, etc.

We have found that it is possible to attain all of the foregoing objects and others which will become apparent hereinafter by providing a wheel-washing apparatus having a rotating brush which is shiftable towards and away from the vehicle path and thus can be pressed inwardly against the wheel of the vehicle and yet is movable in the longitudinal or forward direction of the vehicle during its advance past the apparatus while maintaining its washing action during such movement. While we have referred to a single brush in summarizing the present invention, it will be understood that generally two such brushes will be provided in mirror-symmetrical relationship with respect to a vertical-longitudinal median plane through the vehicle, the brushes being urged towards one another to engage respective vehicle wheels in the operative mode and being shifted outwardly to release the wheels in the inoperative mode. When, in the discussion below, a single brush is mentioned, it should be noted generally that similar structure will be provided at the other brush as well, the reference to a single brush being for convenience only.

As will be apparent, moreover, an essential feature resides in continuously moving the vehicle past the wheel-cleaning station and, at a starting point at this location, bringing the brushes laterally into engagement with the wheels and enabling joint movement of the brushes and the wheels as the vehicle continues its movement along the washing path. Consequently, relative movement of the brushes and the wheels is eliminated and washing is effected as if the automobile had been stationary. The length of the joint-movement stretch and the rate of advance of the vehicle will, of course, determine the duration of wheel washing and should be dimensioned so that the washed wheels are completely clean by the time the second set (rear) of wheels arrives at the starting position. The effect is indeed surprising since it has hitherto been the intent to use relative movement between the brushes and the wheels as the main source of cleaning motion. In fact, the cleaning action according to the present invention makes use of a portion of this motion, since the wheels continue to rotate about their horizontal axes as they are advanced along their wheel-washing stretch. The entire cleaning process is thereby improved and, moreover, loss of energy and throughput, by virtue of intermittent movement of the vehicle, is precluded.

According to another important feature of this invention, upon commencement of the wheel-washing operation and, preferably, before the following set of wheels arrives at the starting location, the brushes are returned to the starting location at a rate which is high compared with the rate of movement of the brushes along the washing stretch. To this end, the brushes may be mounted upon respective carriers provided with restoring means in the form of a forcing mechanism, e.g. constant-pressure cylinders, which rapidly return the brushes to their original positions.

The joint movement of the brushes with the vehicle wheel is achieved, in accordance with the present invention, by providing a follower member on each brush mounting or a single follower for both brushes which engage the vehicle and are entrained thereby along a limited portion of the vehicle-washing path, corresponding to the wheel-washing zone. The follower member is preferably provided on the brush holder or carrier as a freely rotating roller which in the operative positions of the brushes (i.e. the laterally inner positions), lies ahead of the respective vehicle wheel and engages the tire.

Furthermore, the brushes may be so-called disk brushes, i.e. they may have a disk-shaped support rotatable about the disk axis lying perpendicular to the broad surface of the disk and carrying bristles extending inwardly toward the vehicle wheel, at least some of the bristles being flared outwardly so as to spread against the vehicle wheel. The brush carrier, consequently, may have a horizontal drive shaft affixed to the disk brush along its surface remote from the bristles for rotating the brush about its axis and means, operable upon displacement of the brushes toward the vehicle, for substantially aligning the axis of the disk brush and the axis of the wheel to be engaged thereby. The follower previously described may be used for this purpose. It has been found that, when the axes of brush and wheel are aligned, the bristles readily adapt to the wheel diameter and, in fact, provide effective cleaning of the hub caps, wheel covers, wheel disk, rim and tire sidewalls.

The mounting of the brushes, in accordance with the present invention, can be carried out in several ways. Most advantageously, each of the brushes is carried by a depending arm which is swingable about a pivot axis located above the vehicle and extends transversely to the direction of vehicle movement through the installation. The location of this horizontal pivot is preferably such that the brushes swing in a relatively flat circular arc centered on this axis for the duration of joint movement of the brush and the wheel. Since the brush during this arcuate displacement will have a vertical component of movement as well, the edge of the brush contacts a surface of the wheel greater than the area of the brush axially confronting the wheel and, consequently, the surface of the wheel washed by the brush can exceed the area of the brush.

According to another feature of this invention, the brush-carrying arm is pivotally moved above the vehicle for rotation about a generally horizontal axis parallel to the direction of movement of the vehicle. The swinging movement of the brush about this axis enables the brushes to be urged against the wheels generally axially or to be withdrawn from engagement with the wheels. The arm is most desirably brought toward the vehicle with the aid of a fluid-responsive motor, e.g. a pneumatic or hydraulic jack and the passage of the vehicle may control such fluid-responsive means. A switch may be provided along the path of the vehicle for engagement by the latter to initiate inward movement of the brush and pressure of the brush against the vehicle wheel as long as the vehicle operates the switch.

We have also found it to be advantageous to couple the symmetrically located arms on opposite sides of the vehicle path for joint pivotal movement about the axis perpendicular to the direction of movement of the vehicle and to operate both arms with a single fluid drive to urge them into engagement with the wheels. The fluid-responsive means can thus include a hydraulic or pneumatic servomotor spanning the arms, its piston being hingedly connected to one of the arms while the cylinder is hingedly connected to the other.

The entire assembly is advantageously mounted on an upright frame structure having at least one traverse defining the pivot axis for the arms.

The above and other objects, features and advantages of the present invention will become more readily apparent from the following description, reference being made to the accompanying drawing in which:

FIG. 8 is a plan view of a horizontally swinging lever arrangement for carrying the brushes in accordance with the principles of the present invention;

FIG. 9 is a plan view of the system of FIG. 8;

FIG. 10 is a view similar to FIG. 8 illustrating another embodiment of the invention; and FIG. 11 is a vertical section, viewed toward the side of the vehicle, illustrating a control device for the systems of FIGS. 8 - 10.

Figure 1:
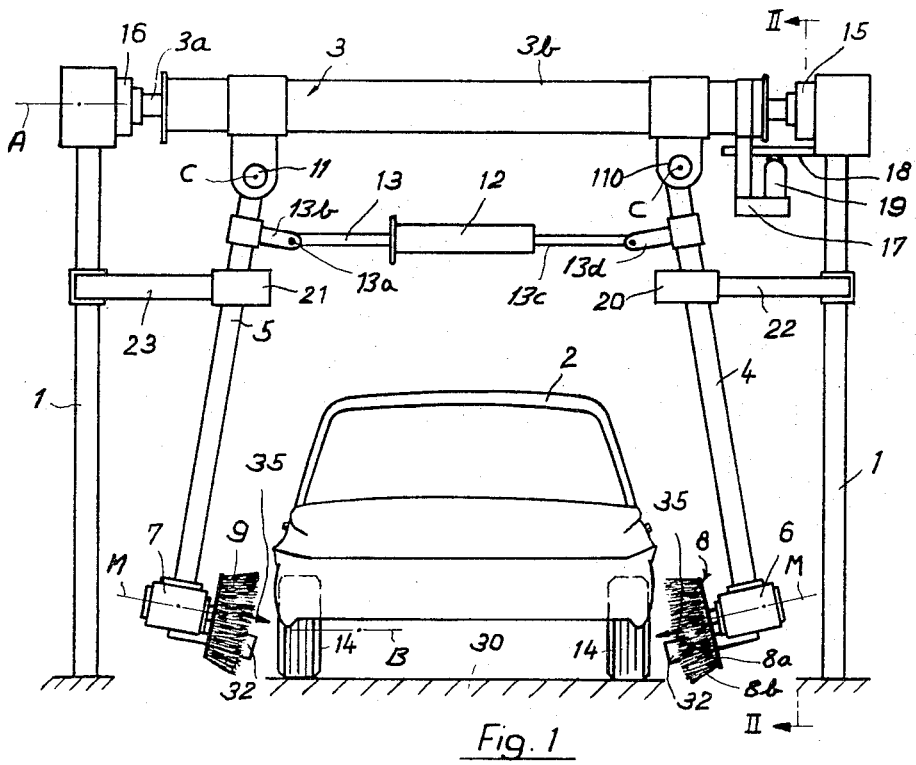
FIG. 1 is a front-elevational view of a wheel-washing apparatus according to the present invention.

In FIG. 1, we have shown a vehicle-wheel washing installation, in accordance with the present invention, adapted to be used in conjunction with a vehicle-washing tunnel or frame, either ahead of the body washer or behind the latter. Means may be provided to spray water and detergent upon the washing brushes and to rinse the wheels in the washing portion of the installation or downstream thereof, such means being conventional and not part of the present invention.

Figure 2:
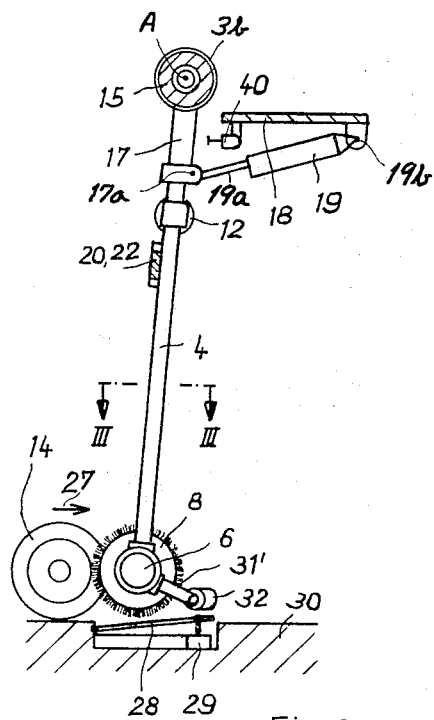
FIG. 2 is a side-elevational view, partly in section, along the line II — II of FIG. 1.
Figure 3:
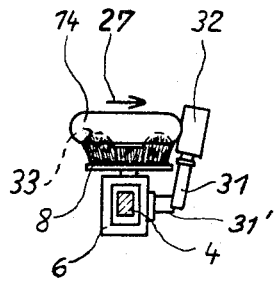
FIG. 3 is a plan view in section along the line III — III of FIG. 2.

In the system of FIG. 1, a pair of supporting uprights 1 flank the vehicle path 30 along which a passenger-type automotive vehicle 2, or a commercial or other vehicle having exposed wheels, is displaced so as to traverse the wheel-washing installation in the direction of arrow 27 (FIGS. 2 and 3).

A traverse 3 consisting of two nested shafts 3a, 3b extends between the uprights or posts 1 above the vehicle path in a horizontal plane and generally transverse to the direction of movement of the vehicle pivotally to support a pair of depending articulated arms 4 and 5 which flank the vehicles shifted along this path. At their upper ends, the posts 1 are fitted with horizontal bearing blocks 15 and 16 which rotatably receive the shaft 3a carrying the larger-diameter tubular shaft 3b of the traverse which is, consequently, rotatable about the horizontal axis A by a hydraulic jack including a cylinder 19. At their lower ends, the arms 4 and 5 carry electric motors 6 and 7 whose axes of rotation M are perpendicular to the arms 4 and 5 but are alignable with the axis B of the wheels 14 of the vehicle engageable by a pair of brushes 8 and 9, respectively carried by the shafts of motors 6 and 7. As particularly indicated for the brush 8, each brush comprises a disk-shaped support 8a mounted on the motor shaft and provided with bristles 8b extending generally in the direction of the wheels 14 but flared outwardly as well to enable thorough scouring of the wheel.

At their upper ends, the arms 4 and 5 are articulated at 10 and 11, respectively, to the beam 3b for swinging movement about pivotal axes C perpendicular to the plane of the paper in FIG. 1. The axes C are horizontal, coplanar, parallel to the direction of displacement of the vehicle, perpendicular to the axis A and located substantially in vertical planes approximately at the sides of the vehicle to be treated so that the brushes 8 and 9 engage the wheels over substantially all of the bristle surface simultaneously.

The arms 4 and 5 can thus swing toward and away from the vehicle 2, i.e. inwardly and outwardly, to engage the wheels or release the vehicle for movement out of the installation. To this end, a hydraulic jack has a cylinder 12 connected by an extension 13 and a hinge 13a with a lug 13b of arm 5, the piston 13c of the jack being hingedly connected to a lug 13d affixed to arm 4. This cylinder has a rest position in which the arms 4 and 5 are spread outwardly.

To swing the arms 4 and 5 about the axis A, we provide an arm 17 secured to the member 3b (FIG. 2) which is coupled by a pivot 17a with a piston rod 19a of cylinder 19 hinged at 19b to a support 18 connected with the posts 1 or forming an adjoining housing structure. The cylinder 19 is constantly pressurized to urge the arms 4 and 5 in a clockwise sense about the axis A, i.e. to the left in FIG. 2. In this position, the arms 4 and 5 may engage stops 20 and 21 mounted by arms 22 and 23, respectively, upon the posts 1. The support 1, 3 may, moreover, be movable relatively to the vehicle so that the vehicle may remain stationary as the support is moved past the vehicle in accordance with principles current in the vehicle-washing field. In this case, the arms 4 and 5 engage the wheels 14 and remain entrained therewith as the frame is moved past the vehicle. No interruption of the frame movement is required and the wheels may be washed by the brushes 8 and 9 as long as the arms 4 and 5 permit. Instead of being supported by the posts 1, moreover, the traverse 3, carrying the pivots 10 and 11, may be journaled in the wash-tunnel walls or may be supported in any convenient structure.

From FIGS. 2 and 3, it will be apparent that the wheels 14 move past the brushes 8 and 9 in the direction of arrow 27 and, as the wheels align with the brushes, depress treadles 28 recessed in the floor 30 to trip a switch 29, the cylinder 12 being actuated by the latter to swing the arms 4 and 5 inwardly and bring the brushes 8 and 9 into engagement with the outer flanks of the wheels 14 of the vehicle.

The brush is provided with a forwardly extending arm 31', carrying an inwardly extending bar 31, terminating in a follower roller 32. The roller 32 engages the forward portion of the wheel when the brushes are clamped thereagainst to entrain the arms 4 and 5 along with the vehicle. FIG. 3 shows that the bristles of the brushes have a peripheral bulge corresponding approximately to the trough-shaped portion of the wheel disk between the rim and the hub as represented in broken lines at 33. In other words, the brush has a configuration conforming approximately to that of the wheel. The bristle lengths, consequently, increase progressively outwardly from the center of the brush and then decrease from the center of the bulge outwardly.

Figure 4:
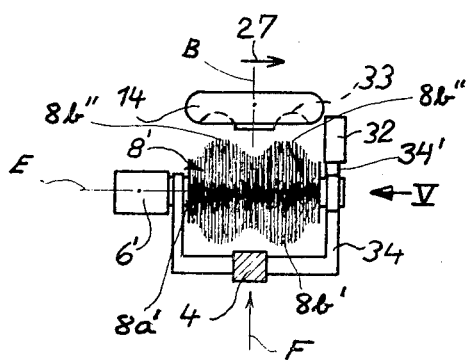
FIG. 4 is a view similar to FIG. 3 but illustrating another brush arrangement in accordance with the present invention.
Figure 5:
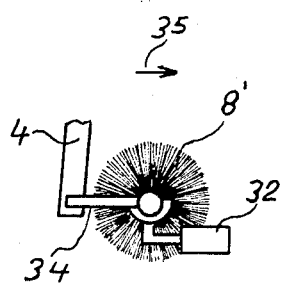
FIG. 5 is an end view thereof in the direction of arrow V of FIG. 4.

In FIGS. 4 and 5 we have shown another brush arrangement for cleaning the wheels 14 of the vehicle, especially designed to penetrate the trough 33 formed in the wheel. In this embodiment, the brush 8' is rotated about an axis E parallel to the direction 27 of vehicle movement and perpendicular to the axis B of the wheel. The bristles 8b' of the brush here extend radially from a shaft 8a' driven by the motor 6' so that the entire brush assembly is shiftable laterally against the wheel in the direction of arrow F. The brush assembly is again mounted upon the swingable arm 4 by a bracket 34.

The brush 8' is substantially cylindrical and is provided with a pair of bulges 8b'' designed to fit complementarily into the circular trough 33 on opposite sides of the axis B as the brush is urged in the direction F. The entrainment of the arms 4, 5 during movement of the vehicle in the direction of arrow 27 ensures rotation of the wheel 14 in the vertical plane, while the brush 8' is rotating in a transverse plane so that the bristles sweep the entire surface of the wheel. The bifurcated bracket 34 is formed with an extension 34', carrying a roller 32, which reaches ahead of the wheel 14 to entrain the arms 4, 5 with the wheels as previously described. It should be understood that the brush system of FIGS. 4 and 5 may be substituted for that of FIGS. 1–3, all other structural details remaining unchanged.

When the brushes 8, 9 or 8', etc. are drawn by cylinder 12 in the direction of arrows 35 against the wheels 14 and pressed against the latter, the forward force applied to the follower rollers 32 by the wheels 14 drives the arms 4 and 5 in the forward direction 27 against the resistance of cylinder 19. The brushes describe a circular arc centered on the axis A and, after a predetermined excursion, the cylinder 12 is so operated that the arms 4 and 5 are spread apart and the vehicle wheels are released.

Under the pressure built up in cylinder 19, the arms 4 and 5 are then swung rearwardly into engagement with the stops 20 and 21 whereby the apparatus is prepared for the next cycle.

Figure 6:
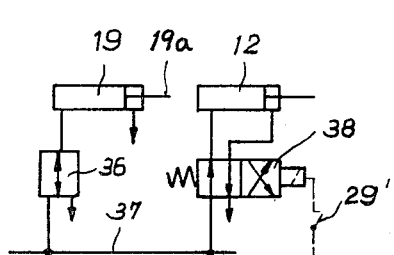
FIG. 6 is a diagram of a fluid network for controlling the system of the present invention.
Figure 7:
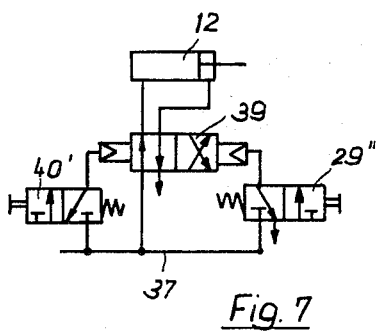
FIG. 7 is a fluid-circuit diagram in accordance with another embodiment of the present invention.

In FIGS. 6 and 7, we have shown two variants of a control system for the apparatus previously described. In FIG. 6, the cylinder 19 is connected behind the piston 19a with a pressure-relief valve 36 communicating with the hydraulic supply 37 so that the arms 4 and 5 always are headed by a constant restoring force in the direction of the abutments 20 and 21. The cylinder 12, however, is provided with a control valve 38 of the reversing type, this valve likewise being connected to the hydraulic network 37. When the vehicle wheel 14 depresses the treadle 28 and trips the switch 29 (FIG. 2), the corresponding electrical contacts 29' are closed and the electromagnetic coil of valve 38 is energized, thereby shifting the valve 38 and reversing the flow of hydraulic fluid to the opposite sides of the cylinder 12 and drawing the arms 4 and 5 against the wheels 14 of the vehicle. In this embodiment, the individual brushes 8, 9, 8' are held against the vehicle wheels 14 and the respective arms 4 and 5 are entrained against the force of cylinders 19 as long as the plate 28 remains depressed and the contacts 29' of switch 29 are closed. When the wheel 14 passes beyond the treadle 28, switch 29 is released and the contacts 29' are opened. The valve spring again shifts the valve member to reverse fluid flow to the cylinder 12 and thereby swing the arms 4 and 5 outwardly. Upon release of the rollers 32 from the wheels, the pressure continuously applied to cylinder 19 effects return of the arms 4 and 5 to their original positions.

In FIG. 7, we have shown a variation of the control system of FIG. 6 for operating the cylinder 12. In the illustrated position, the valves of FIG. 7 so energize the cylinder 12 from the pressure line 37 that its piston is urged outwardly and tends to spread the arms 4 and 5 apart. When the wheel 14 actuates the switch 29 (FIG. 2), a spring-loaded compressed-air valve 29'' is actuated to shift its valve member to the left in FIG. 7. The air pressure is applied to a valve 39, in turn, to displace this valve to the left and reverse the hydraulic fluid flow to the cylinder 12. As a result, the arms 4 and 5 are drawn inwardly and the brushes are urged against the wheels.

The plate 28 can, in this case, be relatively short since only the brief actuation of valve 29'' is required to reverse valve 39. In this system, the arms 4 and 5 are permitted to move with the wheels 14 until the arm 17 (entrained with the arms 4 and 5) engages a limit switch 40 (FIG. 2) which, in turn, actuates the compressed air valve 40' to shift the latter to the right and again reverse the pneumatic pressure on valve 39. The latter valve is reversed to permit release of the wheels by the brushes. Consequently, the extent to which the arms 4 and 5 and the brushes 8, 9 are entrained with the vehicle is determined by the relative positions of the stops 20, 21 and the limit switch 40.

In FIGS. 8 and 9, which illustrate a brush-support structure swingable generally in a horizontal plane (the brushes of FIGS. 1 – 7 swinging substantially in the vertical plane upon entrainment with the vehicle), we have mounted the drive motor 6b for the brush 8 upon a lever 42 which is fulcrumed at 43 to a further lever arm 44. The motor 6b is connected to a transmission 6a which is provided with a pivot 41 to enable the brush 8 to bear flat against the wheel 14 of the vehicle which moves in the direction of arrow 27 as previously described.

The lever arm 44 is, in turn, pivotally mounted at 46 upon a fixed 45 shown to comprise a support plate 48. The fixed support may, of course, represent the wall of a vehicle-washing tunnel. A hydraulic cylinder 47 has its end articulated at 47a to a fixed support 51 and its piston 47b hingedly secured at 47c to the lever arm 44 so that excursion of the piston 47b swings the lever arm 44 in the clockwise sense and (as viewed in FIG. 8) withdraws it from the vehicle. Conversely, retraction of the piston 47b swings the arm 44 in the counterclockwise sense and brings the brush 8 into engagement with the vehicle wheel. A further cylinder 49 is pivotally connected at 49a with the support 48 and has a piston 50 hinged at 50a to the aforementioned lever 42 carrying the brush 8, the motor 6b and the speed-changing transmission 6a. When the effective length of cylinder 49 and piston 50 is equal to that of the arm 44 between the pivots 43 and 46 and, as shown in the drawing, the space between pivots 50a and 43 is equal to the distance between pivots 46 and 49a, the pivots form the vertices of a parallelogrammatic linkage.

By means of the cylinder 47, the lever arm 44 can be swung to urge the brush 8 against the vehicle and, as a consequence of the pivot 41, the brush 8 self-aligns to bear against the wheel 14 over its entire surface. The transmission 6a also carries an arm 31 and roller 32 with engagement for the front of the vehicle wheel 14. Consequently, the brush 8 remains in contact with the wheel 14 as it is entrained with the vehicle in the direction of arrow 27 as the arm 42 swings from its solid-line position into an alternate position illustrated by the dot-dash line 42a. During this swing, the pivot 41 maintains the brush 8 against the wheel so that the axis of the brush coincides with the axis of the wheel. During the swinging movement, the piston 50 is shifted into the cylinder 49 to drive hydraulic fluid past a constant-pressure valve 52 which maintains the line pressure of network 37 in the cylinder 49 at all times. Hence, upon retraction of the lever 44, pressure in cylinder 49 returns lever 42 to its original or solid-line position. A similar valve 53 maintains constant pressure in cylinder 47 to urge the lever 44 in the direction of the vehicle wheel in the "applied" condition of the brush as established by the valve 29a. When this valve is reversed, hydraulic fluid is fed to cylinder 47 so as to shift the piston 47b outwardly and remove the brush 8 from engagement with the wheel. The treadle-operated control system of FIG. 2 can be used for this purpose in conjunction with the circuits of either FIG. 6 or FIG. 7.

The piston 50 is constantly under the pressure created at the secondary side of valve 52 so that lever 42 is constantly urged in the counterclockwise sense when no resistance to such movement, e.g. due to engagement of the roller 32 with the wheel 14, is present. It should be understood that, while reference has been made here to a hydraulic control arrangement, the network of FIGS. 8 and 9 can be used equally well with compressed air.

In the system of FIGS. 8 and 9, the brush 8 is oriented to bear flat against the wheel 14 only upon its engagement with the flank of the wheel. In FIG. 10, however, another parallelogrammatic arrangement is shown which assures proper alignment of the brush 8 with the wheel 14. To this end, the transmission housing 6a is provided with an arm 56 while a bell-crank lever 58 is pivotally mounted on the fulcrum 43. One arm 58a extends from this lever parallel to arm 56, the arms being articulated to a link 55 at 55a and 55b. In this embodiment, the distance between pivots 55a and 55b is equal to the distance between pivots 41 and 43, while the spacing of pivots 41 and 55a is equal to the spacing between pivots 43 and 55b. Consequently, the brush 8 is mounted on a parallelogrammatic linkage whose rearward position is indicated in dot-dash lines at 61 and which maintains the brush 8 parallel to itself in all positions.

The other arm 58b of bellcrank lever 58 is connected to a link 57 by a hinge 60, the link 57 being pivotally secured at 59 to the support 45, 48. Otherwise, cylinders 47 and 49 are provided to control the swing of arms 42 and 44 as described in connection with FIG. 8. The treadle 28a of FIG. 11 controls the valve 29a to operate the systems of FIGS. 8–10 as previously described. It should be noted that, in this case, the plate 28a is hinged at 28b and, in the depressed condition, lies flush with the floor 30.

We claim:

1. An apparatus for the cleaning of the wheels of an automotive vehicle, comprising support means alongside a vehicle station, said support means and a vehicle at said station being relatively shiftable longitudinally of the vehicle; at least one arm movably mounted on said support means and displaceable toward and away from said vehicle; a rotating brush carried by said arm and engageable with a vehicle wheel upon movement of said arm toward said vehicle; entrainment means for jointly displacing said brush with said vehicle at least along a limited portion of the relative movement of said vehicle and said support means; and elevated pivot means swingably connecting said arm to said support means for movement toward and away from said vehicle.

2. The apparatus defined in claim 1, further comprising an articulation along side arm enabling swing movement of said brush in a direction generally parallel to the direction of relative movement of said vehicle and said support means.

3. The apparatus defined in claim 2, further comprising fluid-responsive means coupled with said arm below said articulation for enabling return of said brush in the direction opposite the direction of relative movement of said vehicle and said support means.

4. The apparatus defined in claim 3 wherein said fluid-responsive means includes a cylinder maintained under constant fluid pressure resisting entrainment of said brush with said vehicle.

5. The apparatus defined in claim 1 wherein one such arm and brush are provided along each of the opposite sides of the vehicle station, further comprising a common fluid-responsive device interconnecting said arms and energizable for joint displacement toward and away from said vehicle.

6. An apparatus for the cleaning of the wheels of an automotive vehicle, comprising support means alongside a vehicle station, said support means and a vehicle at said station being relatively shiftable longitudinally of the vehicle; at least one arm movably mounted on said support means and displaceable toward and away from said vehicle; a brush on said arm rotatable about an axis parallel to the direction of relative movement of the vehicle and said support means, said brush being engageable with a vehicle wheel upon movement of said arm toward said vehicle and being provided with generally radial bristles of undulating profile substantially complementary to that of a wheel engaged thereby; and entrainment means for jointly displacing said brush with said vehicle at least along a limited portion of the relative movement of said vehicle and said support means.

7. An apparatus for the cleaning of the wheels of an automotive vehicle, comprising support means alongside a vehicle station, said support means and a vehicle at said station being relatively shiftable longitudinally of the vehicle; at least one arm movably mounted on said support means and displaceable toward and away from said vehicle; a rotating brush carried by said arm and engageable with a vehicle wheel upon movement of said arm toward said vehicle; entrainment for jointly displacing said brush with said vehicle at least along a limited portion of the relative movement of said vehicle and said support means; and a parallelogrammatic linkage coupling said brush with said arm for movement of said brush parallel to itself toward and away from said vehicle.

8. The apparatus defined in claim 7, further comprising a first fluid-operated jack acting upon said arm and a second fluid-operated jack coupled with said linkage.

9. An apparatus for the cleaning of the wheels of an automotive vehicle, comprising support means alongside a vehicle station, said support means and a vehicle at said station being relatively shiftable longitudinally of the vehicle; an arm pivotally mounted on said support means for swinging laterally toward and away from said vehicle; link means articulated to a free end of said arm; a rotating brush carried by said link means on said free end for contact with a vehicle wheel upon a swinging of said arm toward the vehicle; first fluid-operable actuating means for swinging said arm inwardly toward the vehicle; entrainment means on said link means engageable with a wheel approached by said brush for maintaining the latter in contact with said wheel during relative displacement of said support means and the vehicle thereby displacing said link means relatively to said arm; valve means operable in a terminal position of entrainment for reversing said first actuating means to swing said arm outwardly into a withdrawn position with disengagement of said entrainment means from said wheel; and second fluid-operably actuating means coupling said arm with said link means for exerting upon the latter a force resisting relative displacement thereof by said entrainment means, said second actuating means being effective upon disengagement of said entrainment means from said wheel to restore said link means to a normal position relative to said arm.

10. An apparatus for the cleaning of the wheels of an automotive vehicle, comprising support means alongside a vehicle station, said support means and a vehicle at said station being relatively shiftable longitudinally of the vehicle; at least one arm movably mounted on said support means and displaceable toward and away from said vehicle; actuating means for moving said arm inwardly toward said vehicle from an outwardly withdrawn normal position; a rotating brush at the level of the wheels of said vehicle; suspension means including said arm carrying said brush on said support means for lateral inward and outward movement with freedom of limited displacement in a direction parallel to the relative motion of said support means and said vehicle; switch means trippable by said vehicle in a predetermined relative position of said support means and a vehicle wheel for operating said actuating means to move said arm inwardly into a working position of said brush next to said wheel; and entrainment means on said free end effective in said working position for engaging said wheel and maintaining said brush in contact with said wheel over its range of said limited displacement.

11. An apparatus as defined in claim 10 wherein said switch means comprises a treadle in the path of said wheel.

12. An apparatus as defined in claim 11, further comprising a limit switch trippable by and said suspension means at the end of said range for reversing said actuating means to return said arm to its normal position.

13. The apparatus defined in claim 10, further comprising restoring means normally biasing said brush in a direction opposite the direction of displacement of said brush by said entrainment means for restoring said brush for a starting position.

14. The apparatus defined in claim 10 wherein said entrainment means includes a roller engageable with said wheel.

15. The apparatus defined in claim 10 wherein said brush comprises a rotatable disk lying in a plane generally transverse to the axis of said wheel and a plurality of bristles secured to said disk and extending generally axially in the direction of said wheel, said brush having an axis of rotation substantially alignable with that of said wheel.

* * * * *